United States Patent
Bigo et al.

(10) Patent No.: US 6,926,372 B2
(45) Date of Patent: Aug. 9, 2005

(54) HYDRAULIC MOTOR DEVICE WITH DISPLACEMENT SELECTOR AND A BRAKING SYSTEM

(75) Inventors: Louis Bigo, Compiegne (FR); Daniel Ruzicka, Nogent-sur-Oise (FR); Bernard Allart, Crepy-en-Valois (FR)

(73) Assignee: Poclain Hydraulics Industrie, Verberie (FR)

( * ) Notice: Subject to any disclaimer, the term of this patent is extended or adjusted under 35 U.S.C. 154(b) by 22 days.

(21) Appl. No.: 10/450,631

(22) PCT Filed: Dec. 20, 2001

(86) PCT No.: PCT/FR01/04097
§ 371 (c)(1),
(2), (4) Date: Jun. 17, 2003

(87) PCT Pub. No.: WO02/053907
PCT Pub. Date: Jul. 11, 2002

(65) Prior Publication Data
US 2004/0032163 A1 Feb. 19, 2004

(30) Foreign Application Priority Data
Dec. 28, 2000 (FR) .............................................. 00 17171

(51) Int. Cl.[7] .............................................. F16D 31/02
(52) U.S. Cl. ................................. 303/15; 303/3; 60/436; 60/439
(58) Field of Search ................................. 303/3, 10, 15; 188/71.5, 72.3, 170; 60/435, 436, 439, 441, 442, 493; 91/491, 492, 493; 417/273, 491

(56) References Cited
U.S. PATENT DOCUMENTS 5,115,890 A * 5/1992 Noel ........................ 188/71.5
5,220,790 A * 6/1993 Allart et al. .................. 60/435
5,730,041 A * 3/1998 Fillion et al. ................ 91/492
6,038,859 A * 3/2000 Mangano et al. ............. 60/436
6,199,377 B1 * 3/2001 Allart et al. .................. 60/439
6,318,235 B1 * 11/2001 Allart et al. .................. 91/491
6,347,572 B1 * 2/2002 Martin et al. ................ 91/491

FOREIGN PATENT DOCUMENTS

| EP | 000969205 A1 | * | 6/1999 |
| EP | 001058002 A2 | * | 4/2000 |
| FR | 2655090 | | 5/1991 |
| FR | 2673684 | | 9/1992 |

* cited by examiner

Primary Examiner—Christopher P. Schwartz
(74) Attorney, Agent, or Firm—Ladas & Parry LLP

(57) ABSTRACT

Hydraulic motor drive apparatus having a cubic capacity selector (16) which has at least two positions, control means for controlling the selector, which means comprise a hydraulic control chamber (18) suitable for being fed with fluid via a control duct (20), and first opposing return means (17). The apparatus further comprises a brake system having a brake release chamber (38) and second opposing return means (39). The control duct (20) is suitable for being connected to the brake release chamber (38), and the first return means (17) are suitable for returning the cubic capacity selector to its large cubic capacity first position when the pressure in said chamber becomes lower than a first threshold pressure, whereas the second return means (39) return the brake means (36) to their braking position when the pressure in the brake release chamber becomes lower than a second threshold pressure, which is itself lower than said first threshold pressure.

15 Claims, 5 Drawing Sheets

HYDRAULIC MOTOR DEVICE WITH DISPLACEMENT SELECTOR AND A BRAKING SYSTEM

BACKGROUND OF THE INVENTION

1. Field of the Invention

The present invention relates to drive apparatus with a hydraulic motor having a cubic capacity selector suitable for being moved between a first position corresponding to a large active operating cubic capacity and a second position corresponding to a small active operating cubic capacity, the apparatus comprising control means for controlling the selector, which means comprise a hydraulic control chamber suitable for being fed with fluid under pressure via a control duct for the purpose of urging the cubic capacity selector to move to its second position against the force exerted by first return means, the apparatus further comprising a brake system for braking the hydraulic motor, which brake system comprises brake means mounted to move between a braking position and a brake release position, and a brake release chamber suitable for being fed with fluid under pressure via a brake release duct for the purpose of urging said brake means towards their brake release position against the force exerted by second return means.

The hydraulic motor is, particularly, but not exclusively a motor having radial pistons.

2. Description of the Prior Art

Apparatus of this type is known from Document FR 2 655 090. Conventionally, the brake system constitutes a parking brake which is in the braked position when no fluid pressure is sustained in the brake release chamber. In an operating situation, it is necessary to cause a fluid pressure to prevail in the brake release chamber that is sufficient to release the brake and to feed the motor properly with fluid so as to cause its rotor to turn. By controlling the cubic capacity selector, it is possible to select the cubic capacity of the motor so as to obtain the desired drive torque and the desired speed of revolution.

The large cubic capacity of the motor is the cubic capacity in which, for a given fluid flow rate, the motor can deliver high torque but delivers a low output speed. Conversely, in the small cubic capacity, the output speed is higher, but the torque is lower.

The Applicant has observed that, in certain operating situations, there is risk of the motor racing. This applies, for example, to a motor for moving a vehicle in translation when said vehicle is working on a slope while being held back by the motor. In such a case, if the selector is in its small cubic capacity position, the motor can reach high output speeds because it cannot deliver holding-back torque that is sufficient. For safety reasons, racing must be kept under control, which can be obtained by increasing the holding-back toque of the motor, and thus by switching the selector over to its large cubic capacity position.

An object of the present invention is to limit the effects of the motor starting to race by switching the selector over to large cubic capacity automatically, and therefore unfailingly without action being required from an operator.

The invention achieves this object by the facts that the control duct is suitable for being connected to the brake release chamber for the purpose of putting said brake release chamber into communication with the control chamber, and that the first return means are suitable for returning the cubic capacity selector to its large cubic capacity first position when, while the control chamber is communicating with the brake release chamber via the control duct, the pressure in said brake release chamber becomes lower than a first threshold pressure, whereas the second return means are suitable for returning the brake means to their braking position when the pressure in the brake release chamber becomes lower than a second threshold pressure which is lower than said first threshold pressure.

Thus, it is by the pressure from the fluid in the brake release chamber that it is possible to avoid or to limit the effects of racing. Insofar as the small cubic capacity, for the same fluid flow rate, allows higher speeds than the large cubic capacity and has lower torque that facilitates racing, it is preferable to place the selector in its large cubic capacity position so that with the same fluid flow rate, firstly the motor slows down and secondly (holding-back) torque is increased.

The original idea of the invention thus consists in switching from the small cubic capacity to the large cubic capacity, by using the pressure in the brake release chamber as automatic control means.

The invention differs from the prior art.

In Document FR 2 655 090, controlling brake release is dissociated from controlling the cubic capacity selector.

Document FR 2 673 684 proposes to associate them insofar as the brake release chamber communicates with the control chamber for controlling the cubic capacity selector.

The selector naturally takes up a first position which corresponds to the smaller of the two cubic capacities, and towards which it is continuously urged by the return means. When brake release is performed, the control chamber is automatically fed with fluid under pressure, which tends to move the cubic capacity selector into its large cubic capacity second position.

In order to change the cubic capacity while the motor is operating, i.e. when the brake release chamber is filled with fluid under pressure, it is necessary to urge the selector to move from its small cubic capacity first position against the fluid pressure that prevails in the brake release chamber. For this purpose, it is necessary for the selector to have another control chamber, fed with fluid via another duct. The other duct is itself connected to a feed selector, which is connected either to a fluid feed or else to a fluid return.

In FR 2 673 684, the cubic capacity selector is placed automatically into the small motor cubic capacity position in order to avoid any untimely drive from the drive apparatus when the brake means are in the braking position, without however "overdimensioning" the braking system.

Thus, FR 2 673 684 addresses the problem of starting again after braking, while seeking to prevent it being possible to move the vehicle equipped with the drive apparatus when the brake system is active, i.e. when the brake means are in the braking position.

BRIEF SUMMARY OF THE INVENTION

The present invention addresses a different problem because it makes provision, starting from the brake release configuration of the motor, with the selector in the small cubic capacity position, to force a change-over to the large cubic capacity, thereby limiting the effects of racing because the change of cubic capacity generates a higher holding-back torque that is higher in the same ratio as the ratio of the large to the small cubic capacities.

In the invention, cubic capacity change-over is controlled by conventional control, for example, by means of a feed selector suitable, in a manner known per se, for putting the control duct into communication either with a fluid return (first configuration) or with a source of fluid under pressure (second configuration). In the invention, this source is connected to the brake release chamber. For example, the feed selector is constituted by a solenoid valve, or else by a hydraulically driven valve or some other valve.

Thus, while the motor is in a normal operating situation, in which the pressure in the brake release chamber is sufficient, the cubic capacity change-over takes place by causing the feed selector to switch between its two configurations.

When the feed selector is in its first configuration, the control duct of the cubic capacity selector is connected to the fluid return (in particular, it is connected to a pressure-free fluid reservoir) so that the cubic capacity selector is in its large cubic capacity first position, regardless of the pressure that prevails in the brake release chamber.

Conversely, when the feed selector is in its second configuration and when the fluid pressure in the brake release chamber is sufficient, the cubic capacity selector is placed in its (small cubic capacity) second position since the control duct is connected to the brake release chamber. When, starting from this situation, the pressure decreases in the brake release chamber to become less than the first threshold pressure, then the cubic capacity selector returns to its first position under the effect of the first return means that overcome the opposing forces due to the pressure prevailing in the first control chamber, which pressure is itself dependent on the pressure prevailing in the brake release chamber. Thus, the cubic capacity selector returns automatically to its first position, without it having been necessary to modify its control by changing the position of the feed selector.

In other words, a decrease in pressure in the brake release chamber affects the cubic capacity selector only, in order to urge it to move towards its first position. This automatic return to the large active operating cubic capacity is thus obtained by moving a single selector (the cubic capacity selector), which makes it possible to achieve it optimally in terms both of response time and of operating reliably.

The invention uses means for decreasing the pressure in the brake release chamber when the vehicle starts racing due to drive from the drive apparatus. For example, said means may be a speed limiter and valves for isolating an open circuit, of the type described in FR 1 463 911 for an open circuit for a hydraulic excavator.

Thus, advantageously the brake release chamber is connected to the feed duct for feeding the hydraulic motor with fluid. This connection may be implemented via a pressure reducer.

The fact that the brake release chamber is no longer fed by an auxiliary booster pump, but rather by the main pump feeding the motor (preferably via the pressure reducer which maintains a pressure in said chamber that is no higher than a determined maximum pressure) makes it possible to ensure that any racing of the vehicle due to drive from the motor, which racing causes a decrease in pressure in the feed main duct, also causes a decrease in pressure in the brake release chamber.

Advantageously, the control means comprise the above-mentioned feed selector which, in its second configuration, puts the control duct into communication with a fluid feed duct that communicates continuously with the brake release chamber.

This constitutes a simple way of controlling the cubic capacity selector.

Advantageously, the feed duct is connected to a feed main duct for feeding the motor with fluid at high pressure via a pressure reducer, which also applies to the brake release duct to which the feed duct is connected.

In another advantageous variant for controlling the cubic capacity selector, the control means for controlling said cubic capacity selector further comprise an additional hydraulic control chamber suitable for being fed with fluid under pressure via an additional control duct, the hydraulic chamber and the additional hydraulic chamber respectively having first and second moving walls which respectively define in said chambers first and second bearing surfaces for the fluid present in said chambers, and which respectively form first and second control pistons suitable for co-operating with the moving slide of the cubic capacity selector; the bearing surfaces are such that, when the pressure in the brake release chamber which is in communication with the control chamber becomes lower than the first threshold pressure, the force exerted by the second piston on the slide of the selector is insufficient to hold said slide in its second position, independently of the fluid pressure that prevails in the additional control chamber.

Such control means, using the additional hydraulic control chamber, offer the advantage of being extremely compact because they avoid requiring the presence of a feed selector having a moving slide distinct from the slide of the cubic capacity selector.

Advantageously, in this case, the control duct communicates continuously with the brake release duct which itself is connected continuously to a feed main duct for feeding the motor with fluid at high pressure via a pressure reducer.

The invention is advantageously applicable to open circuits including speed limiters. In which case, when the pressure decreases in the feed main duct of the motor, and therefore in the brake release chamber, the cubic capacity selector is placed automatically in its large cubic capacity position, in which the available torque is higher than the torque that is available in the small cubic capacity, while the speed is lower. Simultaneously, the speed limiter generates a back pressure in the discharge main duct of the motor, thereby causing hydrostatic braking. Starting from a small cubic capacity position, the automatic change-over of cubic capacity makes it possible to reduce the speed and thus to guarantee hydrostatic braking with the maximum available torque before the mechanical braking means are engaged.

This provision is particularly advantageous when it is associated with the fact that, as indicated above, the brake release duct, and therefore the feed duct or the control duct is connected to a feed main duct of the motor via a pressure reducer, because it then improves the operating safety of a machine driven by the motor of the invention, in a critical situation in which the machine is on a downhill slope.

In which case, the machine tends to be driven by its own weight, so that the motor starts operating as a pump. In which case, the more the machine races, the more the pressure in the feed main duct decreases. When said pressure becomes lower than the first threshold pressure, the cubic capacity selector automatically returns to its first position, so that the motor goes over to its large cubic capacity, which forces the machine to slow down.

The invention will be well understood and its advantages will appear more clearly on reading the following detailed description of an embodiment shown by way of non-limiting example.

BRIEF DESCRIPTION OF THE DRAWING FIGURES

The description refers to the accompanying drawings, in which.

DETAILED DESCRIPTION OF THE PREFERRED EMBODIMENTS

Figure 1:
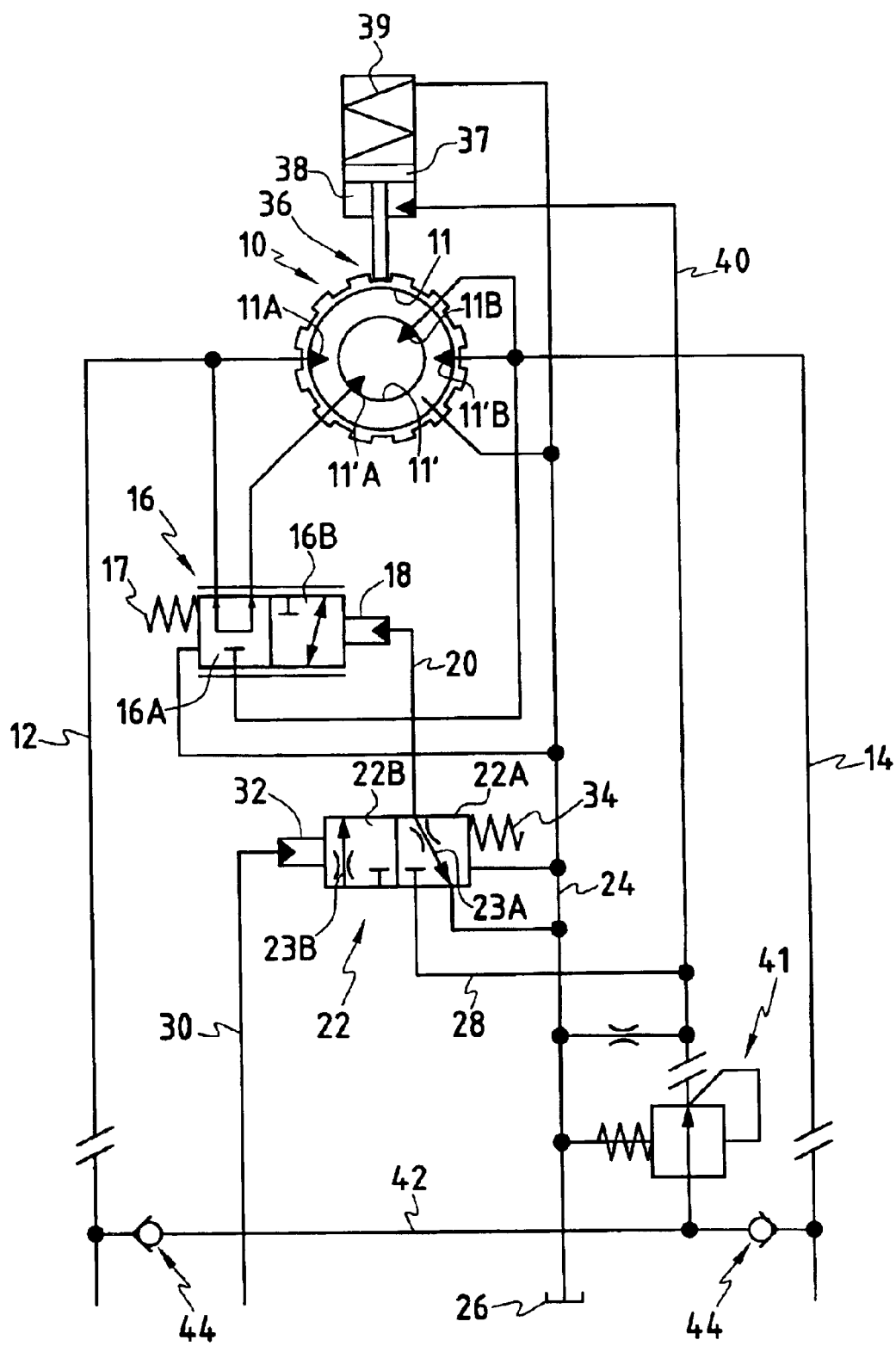
FIG. 1 is a diagrammatic view of a hydraulic circuit including the apparatus of the invention.

FIG. 1 shows a hydraulic motor 10 having two active operating cubic capacities. More precisely, the motor is shown diagrammatically in the form of two half-motors respectively referenced 11 and 11'. The large active operating cubic capacity of the motor is obtained when both of the half-motors are active, by both being connected firstly to a first main duct 12 and secondly to the second main duct 14. Depending on the way in which they are connected to a main pump (not shown), the ducts serve respectively as the feed duct or as the discharge duct. It is an open circuit, in which the main duct that serves as the feed duct is connected to the delivery orifice of a pump, while the main duct that serves as the discharge duct is connected to a pressure-free reservoir. These provisions are not shown, but they are described, e.g. in FR 1 463 911.

The circuit shown in FIG. 1 includes a cubic capacity selector 16 having two positions. In FIG. 1, it is shown in its first position 16A, in which respective main orifices 11A and 11'A of the half-motors are connected together and are connected to the main duct 12. The other main offices 11B and 11'B of the half-motors are connected continuously to the main duct 14. This situation is the large cubic capacity situation. In its second position 16B, the cubic capacity selector connects the main orifice 11'A of the half-motor 11' to the main orifices 11B and 11'B, which are themselves connected to the duct 14. Thus, both main orifices 11'A and 11'B of the half-motor 11' are connected to the same pressure, and said half-motor is inactive. This situation is the small cubic capacity situation.

The cubic capacity selector 16 is controlled hydraulically by a control chamber 18 which is connected to a control duct 20.

The selector 16 is continuously urged towards its first position 16A by first resilient return means 17, e.g. constituted by a spring.

The circuit also includes a feed selector 22 which, in FIG. 1, is in a first position 22A in which it connects the duct 20 to a fluid return. The duct 20 is then connected to a fluid return 24 which is itself connected to a pressure-free reservoir 26. In its second position 22B, the selector 22 connects the control duct 20 to a feed duct 28. The selector 22 thus has a first port connected to the feed duct 20, a second port connected to the fluid return duct 24, and a third port connected to the feed duct 28. Depending on the position of the selector, the first port is connected either to the second port or to the third port.

In the example shown, the selector 22 is controlled hydraulically via a hydraulic control duct 30 connected to a control chamber 32. Feeding said chamber with fluid moves the selector 22 into its second position 22B, while it is returned naturally towards its first position 22A by resilient return means such as a spring 34. The selector 22 and the duct 30 serve to control the cubic capacity selector 16.

The circuit shown in FIG. 1 also includes a brake system for braking the hydraulic motor, which brake system comprises brake means 36, e.g. constituted by a stack of disks secured respectively to the rotor or to the stator, and interleaved with one another, as shown in Document FR 2 655 090. However, in the example shown, the brake means 36 are constituted by a positive clutch made up of first clutch teeth secured to the rotor and of second clutch teeth secured to the stator. The clutch teeth come into mutual engagement in the braking position, and they are spaced apart from one another in the brake release position. The brake system further comprises a brake release chamber 38 which can be fed with fluid via a brake release duct 40 so as to urge the brake means towards their brake release position in which they do not co-operate with one another for braking purposes.

The brake means are continuously urged towards their brake release position by second resilient return means 39, e.g. constituted by a spring such as a Belleville spring washer.

In order to urge the brake means between their braking position and their brake release position, the brake system further comprises a brake piston 37 itself urged in one displacement direction by the pressure of the fluid in the chamber 38, and in the other direction by the spring 39.

The feed duct 28 communicates with the brake release chamber 38. More precisely, it is connected to the brake release duct 40. For example, this connection takes place without a constriction being interposed, in which case the pressure in the duct 28 is continuously the same as in the brake release chamber 38.

The stiffness and the pre-stress of the spring 17 are such that the return effect of the spring becomes predominant compared with the pressure that prevails in the chamber 18 whenever said pressure becomes lower than a "first determined pressure" PS1 which holds the brake means in the brake release position.

The spring 39 is such that its return effect becomes predominant relative to the stresses exerted by the pressure prevailing in the chamber 38 when said pressure becomes lower than a second determined pressure, referred to below as the "second threshold pressure" PS2.

When the feed selector 22 is in the second configuration, and when the control duct 20 is connected without a constriction to the brake release chamber 38 via the feed duct 28, then the pressure in the control chamber 18 is equal to the pressure in the brake release chamber. When the feed selector is in the same configuration, and when a constriction is interposed between the control chamber 18 and the brake release chamber, as it is in the example shown in FIG. 1 which shows a constriction in the duct 23A of the selector 22 that connects its first port to its third port, then the pressure in the control chamber 18 is lower than the pressure in the brake release chamber, but naturally it depends on said pressure in the brake release chamber. Thus, given the way in which the chamber 18 is connected to the chamber 38 when the selector 22 is in its second configuration, it is observed that the "first determined pressure" inside the chamber 18 below which the cubic capacity selector 16 goes over automatically to its first position under the action of the return means corresponds to a "first threshold pressure" PS1 in the brake release chamber 38.

In the invention, the first threshold pressure is higher than the second threshold pressure.

In this way, the invention enables cubic capacity to be changed automatically and more simply from a motor operating situation in which, under "normal" conditions, the pressure in the brake release chamber is higher than the first and second threshold pressures, and in which the motor operates in its small active cubic capacity, the selector 22 being in its second configuration 22B and the selector 16 being urged into its second position 16B by means of the ducts 20 and 22 being interconnected. When, starting from this situation, the pressure in the brake release chamber decreases to below PS1 while remaining higher than PS2, then the pressure in the chamber 18 becomes lower than the "first determined pressure" so that the selector 16 goes over automatically to its first position, and the motor returns automatically to its large cubic capacity. The pressure must decrease further to below PS2 in order for the brake release to cease and for the brake means 36 to take up their braking position under the effect of the return means 39.

The feed duct 28 is connected to a feed main duct of the motor via a pressure reducer 41. More precisely, the inlet of the pressure reducer is connected to a duct segment 42 which is itself connected to the two main ducts 12 and 14 via non-return valves 44. The inlet of the reducer is thus connected to the high feed pressure of the motor. The feed duct 28 is connected to the outlet of the pressure reducer, as is the brake release duct 40.

By means of the reducer, the pressure in the ducts 28 and 40 and thus in the brake release chamber 38 does not exceed a limit value. For example, when the motor apparatus serves to move plant such as a hydraulic excavator in translation, the limit pressure is about 27 bars, while the threshold pressures PS1 and PS2 are respectively approximately in the range 15 bars to 20 bars and approximately in the range 9 bars to 10 bars. In general, provision is preferably made for the difference between the first and second threshold pressures to be approximately in the range 5 bars to 10 bars. Provision is also made for the difference between the first threshold pressure and the limit pressure sustained by the pressure reducer to be not less than 5 bars.

In the example shown in FIG. 1, the feed selector 22 has two positions and three ports. It has a first link duct 23A which connects its first port to its second port so that, in its first configuration, it connects the duct 20 to the fluid return, and a second link duct 23B which connects its first port to its third port, so that, in its second configuration, it connects the duct 20 to the duct 28. Advantageously, at least one of said link ducts is provided with a constriction. The constriction sustains head loss between the duct 20 and that one of the ducts to which it is connected as a function of the position of the selector 22, which makes it easier for the selector 16 to go between its two positions smoothly.

Figure 2:
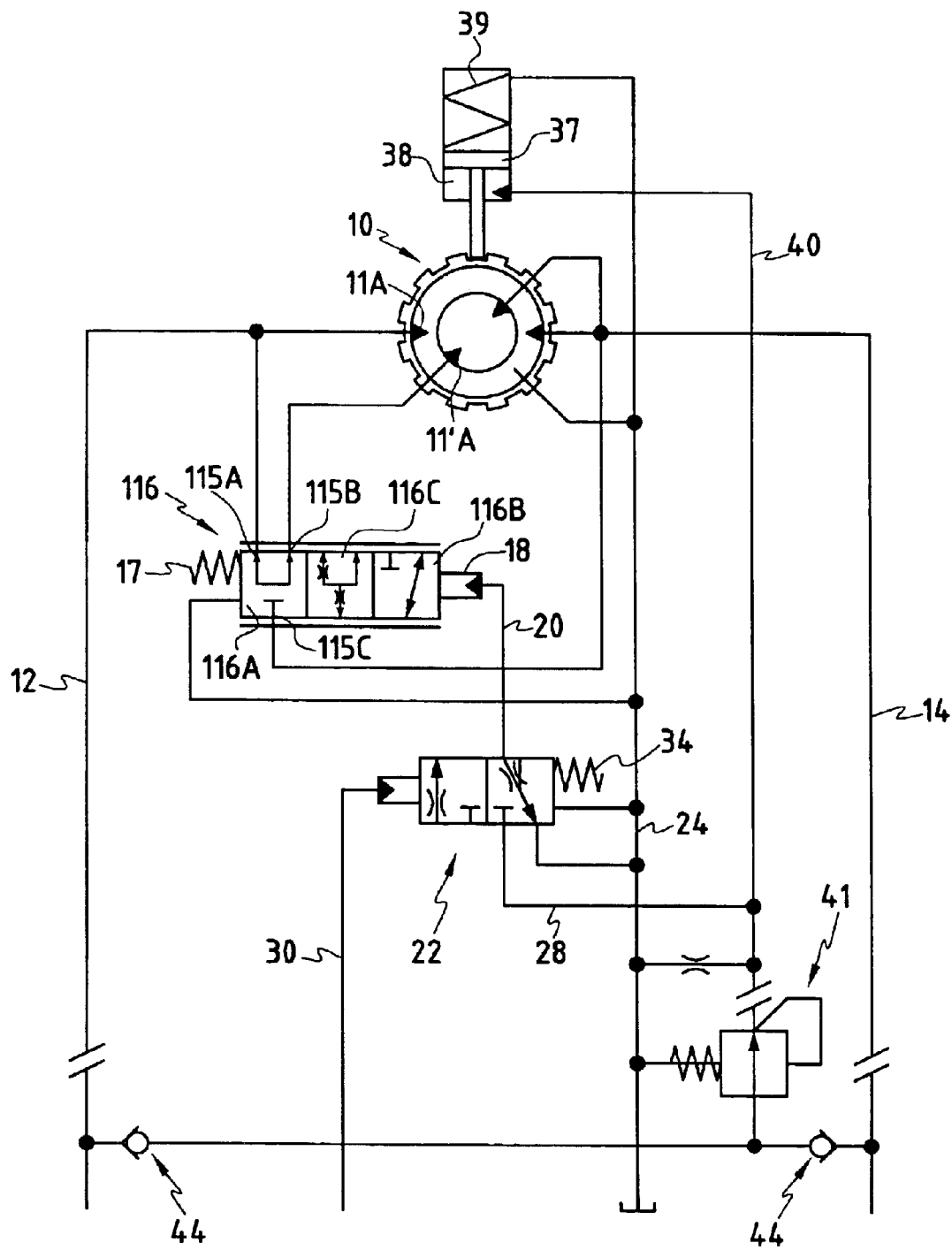
FIG. 2 shows a variant of the circuit.

In FIG. 2, the elements analogous to those shown in FIG. 1 are given the same references. The cubic capacity selector 116 is slightly different from the cubic capacity selector of FIG. 1 because, between its first and second stable positions 116A and 116B, it has an intermediate position 16C whose configuration makes it possible to avoid or at least to limit jolting while the cubic capacity is being changed.

This cubic capacity selector is of the type described in European Patent Application No. 1 058 002, whose contents are integrally incorporated into the present application.

Thus, when the selector 116 is in the first position 116A, its first two ports 115A and 115B, connected to respective ones of the orifices 11A and 11'A of the motor, communicate freely with each other, while its third port 115C is isolated from them. In the second position 116B, the first port 115A is isolated from the other two which are connected together. In the intermediate position 116C, the ports 115A and 115B are interconnected via a first link passageway, and the ports 115B and 115C are interconnected via a second link passageway. A constriction generating head loss is disposed on at least one of said passageways.

In the example shown, both of the two passageways respectively from 115A and 115B and from 115B to 115C have constrictions. The selector 116 is a progressive valve, and the control means for controlling the selector (chamber 18 and spring 17) are advantageously such that the intermediate situation during which the third position 116C of the selector causes all three valves to communicate is sustained for a determined lapse of time, so as to avoid jolts while the cubic capacities are being changed. Said control means may be of any type described in Document EP-1 058 002.

Figure 3:
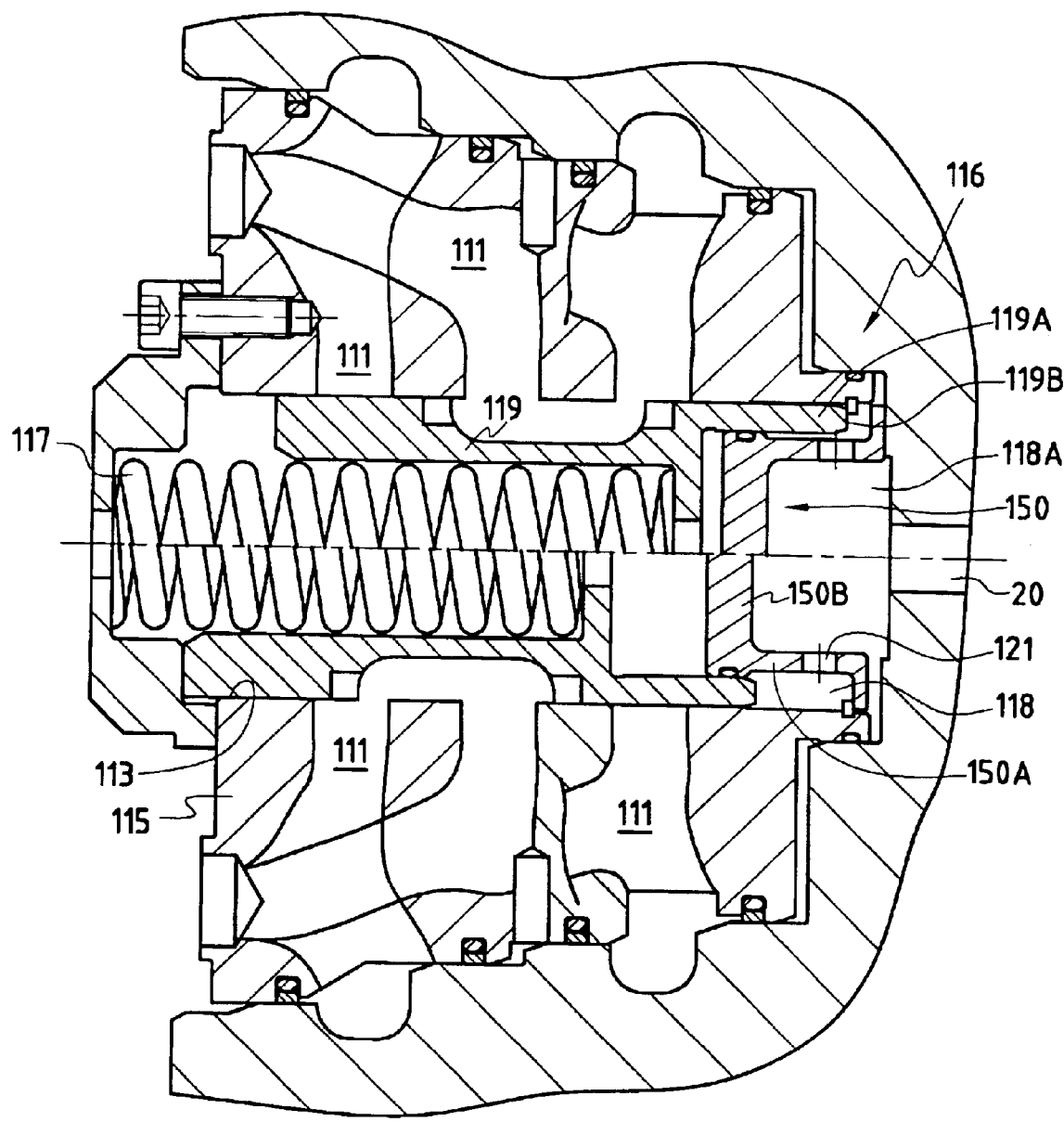
FIG. 3 is a section view of a cubic capacity selector suitable for the apparatus of the invention, for use in the circuits shown in FIGS. 1 and 2.

FIG. 3 is a fragmentary axial section view of an embodiment of the motor 10. For example, this motor is of the type described in French Patent Application FR 2 780 450. The cubic capacity selector 116 is disposed in a bore 113 provided in the internal distributor 115 of the motor, which distributor includes the distribution ducts 111 serving to connect the feed main duct and the discharge main duct to the cylinders of the radial-piston cylinder blocks (not shown).

The cubic capacity selector comprises a slide 119 which is mounted in a bore 113 to move between two positions corresponding to respective ones of the two above-defined positions of the selector.

The control means for controlling the selector comprise the return spring 117 which urges the slide 119 continuously to return towards its first position, shown in the top half of FIG. 3, and the control chamber 118 which is fed with fluid via the control duct 20 so as urge the slide 119 to move towards its second position, shown in the bottom half of FIG. 3.

In the variant shown, said chamber has a particular shape which makes it possible to use a spring 117 that is relatively small, in spite of the relatively large cross-section of the slide 119. The bearing surface against which the pressure of the fluid contained in the control chamber is exerted to urge the slide to move towards its second position is significantly smaller than the cross-section of the slide.

For this purpose, the slide has an annular portion 119A which defines a moving wall of the control chamber that forms said bearing surface 119B.

More precisely, said annular portion is formed by an extension to the end of the slide forming a cavity in which the extension defines an axial bearing face. A partition-forming part 150 is disposed at the end of the bore 113 while being wedged relative thereto. Said part has an axial wall 150A and an end wall 150B extending transversely to said axial wall. Thus, an annular chamber is provided between the annular portion 119A of the slide 119 and the axial wall of the bore 113. The annular chamber forms the control chamber 118 with which the control duct 20 communicates via a central "pre-chamber" 118A formed in the concave portion of the part 150 and via holes 121 through the axial wall 150A. The extension 119A co-operates with the part 150 by sliding in leaktight manner relative thereto.

The bearing surface for the fluid in the chamber 118 is formed only by the free end 119B of the extension 119. For example, it represents about one third of the cross-section of the slide 119.

Figure 4:
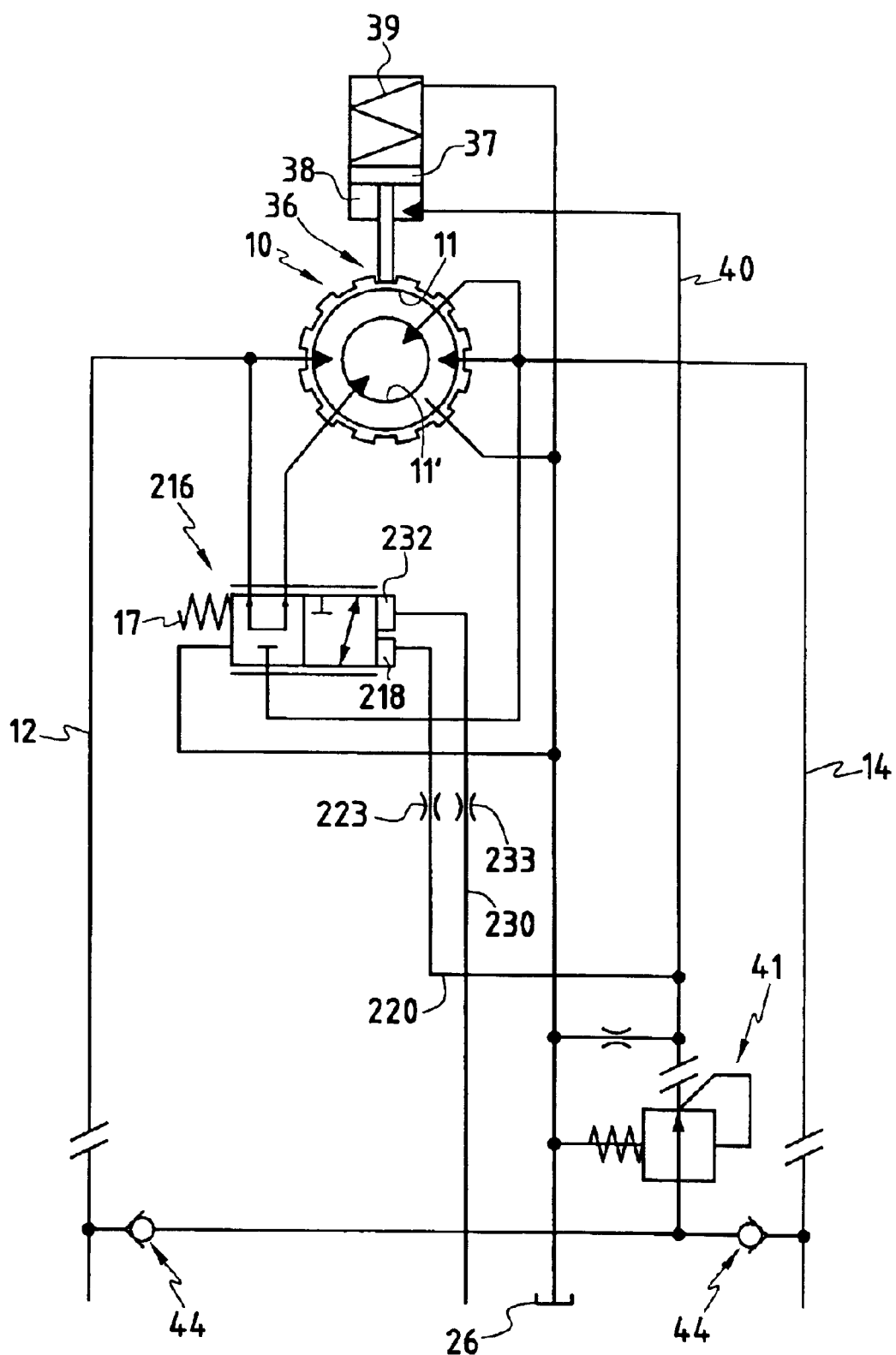
FIG. 4 shows a hydraulic circuit including the apparatus of the invention in a variant embodiment.

A description follows of FIG. 4, in which those elements which are unchanged relative to FIG. 1 are designated by the same references as in FIG. 1.

The cubic capacity selector 216 is urged to return towards its first position by the spring 17. The control means for controlling said selector further comprise a control chamber 218 and the control duct 220 which, in this variant, is connected continuously to the brake release duct 40 and thus to the brake release chamber 38. Advantageously, a constriction 223 is disposed on said control duct 220.

For the purposes of controlling the selector 216, the control means further comprise an additional hydraulic control chamber 232 which can be fed with fluid under pressure via an additional control duct 230 which can itself be connected to a control pressure like the duct 30 in FIGS. 1 and 2. A constriction 233 may be disposed on said duct 230.

Figure 5:
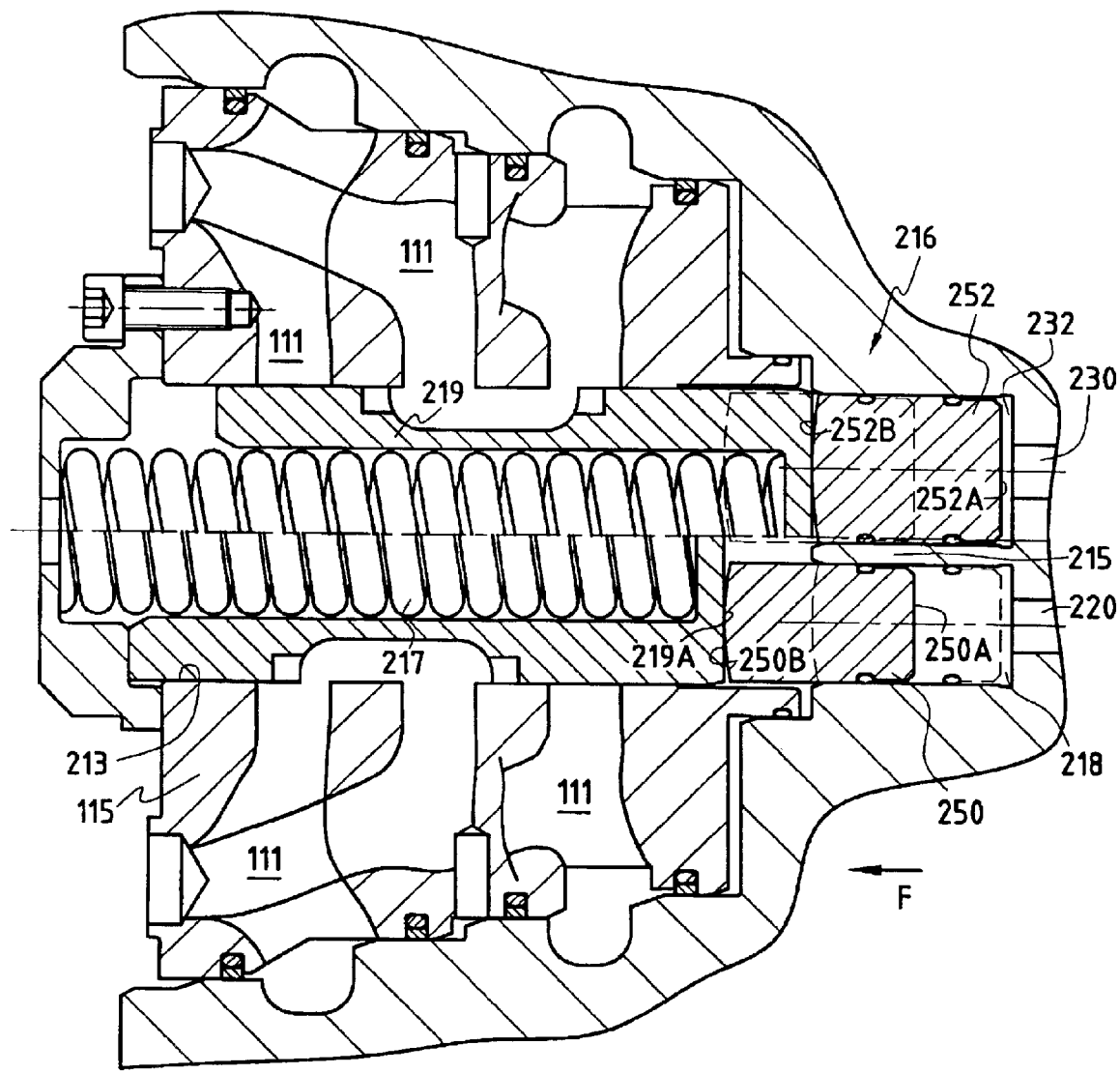
FIG. 5 is a section view through a cubic capacity selector suitable for this variant.

The shape of the selector 216 will be better understood with reference to FIG. 5. FIG. 5 shows a view analogous to the view shown in FIG. 3, and it is possible to recognize the internal distributor 115 and its distribution ducts 111. The slide 219 of the selector 216 is mounted to move in the bore 213 of the distributor 115 and is urged to return towards its first position (shown in the top half of the figure) by the spring 217, while the hydraulic control chambers urge it to move towards its second position (shown in the bottom half of the figure) when they are fed with fluid under pressure.

That end of the bore 213 which is opposite from the spring 217 has a partition 215 which extends axially, thereby defining two hydraulic control chambers 218 and 232 which are separated from each other in leaktight manner. First and second control pistons, respectively 250 and 252, are disposed respectively in the chamber 218 and in the chamber 232. Those transverse end faces 250A and 252A of the pistons which are opposite from the slide 219 respectively form first and second moving walls for the chambers 218 and 232.

The chambers 218 and 232 being fed with fluid via the control duct 220 and via the additional control duct 230 urges the respective pistons to move in the direction indicated by arrow F. Their ends 250B and 252B opposite from the ends 250A and 252A then co-operate with the end 219A of the slide to urge it to move in the direction indicated by arrow F, against the return force exerted by the spring 217.

The two pistons 250 and 252 are independent from each other. The piston 250 is caused to move by the control chamber 220 communicating with the brake release chamber, while the piston 252 is caused to move by the pressure of the control fluid in the duct 230.

The bearing surfaces 250A and 252A and the fluid pressures in the chambers 218 and 230 determine the force that the pistons can exert on the slide 219 to urge it to move towards its second position. The pressures in the control chambers 218 and 232 depend directly on the pressures in the ducts 220 and 230, while taking account of any constrictions 223 and 233.

The bearing surfaces 250A and 252A and the spring 217 are dimensioned such that:

when the pressure in the brake release chamber 38 is stabilized at its limit value (about 27 bars) for "normal" motor operating conditions, and when the pressure in the additional control duct 230 is substantially zero, then the force exerted by the piston 250 on the slide due to the chamber 218 being fed with fluid is insufficient to cause the slide to move to its second position against the opposing force exerted by the spring 217 on said slide;

when the pressure in the brake release chamber is stabilized at said limit value, and when the pressure in the additional control duct 230 is at the control value, then the forces exerted by the two pistons 250 and 252 on the slide due to the chambers 218 and 232 being fed with fluid places the slide 219 in its second position; and when the pressure in the control duct 230 is at the control value but when the pressure in the brake release chamber becomes lower than the first threshold value PS1, then the force exerted by the piston 252 on the slide 219 due to the fluid pressure prevailing in the chamber 232 is insufficient to hold the slide in its second position, and said slide goes back to its first position.

For example, the spring is dimensioned to exert a force of about 800 N (corresponding to an equivalent pressure of about 5 bars) on the slide when it is in its first position, and to exert a force of about 1115 N (corresponding to an equivalent pressure of about 7 bars) on the slide when it is in its second position, while the diameters of the first and second pistons are respectively about 18 mm and about 22 mm, and the control pressure and the pressure PS1 are respectively about 10 bars and about 15 bars.

It should be emphasized that, in all of the variants shown in the figures, the control duct may be connected to the brake release chamber to establish fluid communication at a flow rate controlled by a constriction between said brake release chamber and the control chamber.

In FIGS. 1 and 2, said communication is controlled by two independent constrictions depending on the position of the selector 22. In FIG. 4, said communication is continuous and controlled by the constriction 223.

What is claimed is:

1. Drive apparatus with a hydraulic motor having a cubic capacity selector suitable for being moved between a first position corresponding to a large active operating cubic capacity and a second position corresponding to a small active operating cubic capacity, the apparatus comprising control means for controlling the selector, which means comprise a hydraulic control chamber suitable for being fed with fluid under pressure via a control duct for the purpose of urging the cubic capacity selector to move to its second position against the force exerted by first return means, the apparatus further comprising a brake system for braking the hydraulic motor, which brake system comprises brake means mounted to move between a braking position and a brake release position, and a brake release chamber suitable for being fed with fluid under pressure via a brake release duct for the purpose of urging said brake means towards their brake release position against the force exerted by second return means, the control duct being suitable for being connected to the brake release chamber for the purpose of putting said brake release chamber into communication with the control chamber, and in the first return means being suitable for returning the cubic capacity selector to its large cubic capacity first position when, while the control chamber is communicating with the brake release chamber via the control duct, the pressure in said brake release chamber becomes lower than a first threshold pressure, whereas the second return means are suitable for returning the brake means to their braking position when the pressure in the brake release chamber becomes lower than a second threshold pressure which is lower than said first threshold pressure.

2. Apparatus according to claim 1, wherein the control means for controlling the cubic capacity selector further comprise a feed selector suitable for taking up a first configuration in which said feed selector puts the control duct into communication with the fluid return, and a second configuration in which said feed selector puts the control duct into communication with a fluid feed duct, the feed duct communicating continuously with the brake release chamber.

3. Apparatus according to claims 2, wherein the brake release chamber is connected to the feed duct of the hydraulic motor and the feed duct is connected to a feed main duct for feeding the motor with fluid at high pressure via a pressure reducer.

4. Apparatus according to claim 2, wherein the feed selector includes a first link duct suitable for putting the control duct into communication with a fluid return when said selector is in the first configuration, said first link duct having a constriction.

5. Apparatus according to claim 2, wherein the feed selector has a second link duct suitable for putting the control duct into communication with the feed duct when said selector is in the second configuration, said second link duct having a constriction.

6. Apparatus according to claim 1, wherein the cubic capacity selector comprises a moving slide and the control means for controlling the cubic capacity selector further comprise an additional hydraulic control chamber suitable for being fed with fluid under pressure via an additional control duct, the hydraulic chamber and the additional hydraulic chamber respectively having first and second moving walls which respectively define in said chambers first and second bearing surfaces for the fluid present in said chambers, and which respectively form first and second control pistons suitable for cooperating with the moving slide of the cubic capacity selector, and the bearing surfaces being such that, when the pressure in the brake release chamber which is in communication with the control chamber becomes lower than the first threshold pressure, the force exerted by the second piston on the slide of the selector is insufficient to hold said slide in its second position, independently of the fluid pressure that prevails in the additional control chamber.

7. Apparatus according to claim 6, wherein the brake release chamber is connected to the feed duct of the hydraulic motor.

8. Apparatus according to claim 6, wherein the control duct communicates continuously with the brake release duct.

9. Apparatus according to claim 8, wherein the control duct communicates continuously with the brake release duct via a constriction.

10. Apparatus according to claim 1, wherein the cubic capacity selector has three ports, first and second ports of said cubic capacity selector being connected together and isolated from a third port thereof when said cubic capacity selector is in the first position, while said second and third ports are connected together and isolated from the first port when said selector is in its second position, and wherein said cubic capacity selector is suitable for taking up an intermediate position between the first and second positions thereof, and in which said three ports are interconnected and a cross-section of at least one of passageways between the first and second ports and between the second and third ports is constricted.

11. Apparatus according to claim 10, wherein further comprising means for holding the selector in the intermediate position for a lapse of time.

12. Apparatus according to claim 1, wherein the first threshold pressure lies in the range 15 bars to 20 bars, while the second threshold pressure lies in the range 9 bars to 10 bars.

13. Apparatus according to claim 1, wherein a difference between the first and second threshold pressures lies in the range 5 bars to 10 bars.

14. Apparatus according to claim 1, wherein the brake release chamber is connected to the feed duct of the hydraulic motor.

15. Apparatus according to claim 1, wherein the cubic capacity selector comprises a moving slide having an annular portion which defines a moving wall of the control chamber that forms a bearing surface against which the pressure of the fluid present in said chamber is exerted to urge the slide to move into its second position.

* * * * *